(12) United States Patent
Blake et al.

(10) Patent No.: US 7,085,897 B2
(45) Date of Patent: Aug. 1, 2006

(54) MEMORY MANAGEMENT FOR A SYMMETRIC MULTIPROCESSOR COMPUTER SYSTEM

(75) Inventors: Michael A. Blake, Wappingers Falls, NY (US); Carl B. Ford, Poughkeepsie, NY (US); Pak-kin Mak, Poughkeepsie, NY (US); Gary E. Strait, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 10/436,491

(22) Filed: May 12, 2003

(65) Prior Publication Data

US 2004/0230750 A1 Nov. 18, 2004

(51) Int. Cl.
*G06F 12/00* (2006.01)

(52) U.S. Cl. ..................................... 711/144
(58) Field of Classification Search ............... None
See application file for complete search history.

(56) References Cited

U.S. PATENT DOCUMENTS

| | | | |
|---|---|---|---|
| 4,037,209 A | 7/1977 | Nakajima et al. | 364/200 |
| 4,511,964 A | 4/1985 | Georg et al. | 364/200 |
| 4,811,216 A | 3/1989 | Bishop et al. | 364/200 |
| 4,855,903 A | 8/1989 | Carleton et al. | 364/200 |
| 4,980,822 A | 12/1990 | Brantley, Jr. et al. | 364/200 |
| 5,093,913 A | 3/1992 | Bishop et al. | 395/650 |
| 5,123,106 A | 6/1992 | Otsuki et al. | 395/725 |
| 5,228,127 A | 7/1993 | Ikeda et al. | 395/200 |
| 5,269,013 A | 12/1993 | Abramson et al. | 395/425 |
| 5,428,803 A | 6/1995 | Chen et al. | 395/800 |
| 5,560,027 A | 9/1996 | Watson et al. | 395/800 |
| 5,710,907 A | 1/1998 | Hagersten et al. | 395/475 |
| 5,727,150 A | 3/1998 | Laudon et al. | 395/200.08 |
| 5,784,697 A | 7/1998 | Funk et al. | 711/170 |
| 5,787,468 A | 7/1998 | Clark | 711/121 |
| 5,887,138 A | 3/1999 | Hagersten et al. | 395/200.45 |
| 5,893,144 A | 4/1999 | Wood et al. | 711/122 |
| 5,895,487 A * | 4/1999 | Boyd et al. | 711/122 |
| 5,926,829 A | 7/1999 | Hagersten et al. | 711/120 |
| 5,931,938 A | 8/1999 | Drogichen et al. | 712/15 |
| 5,999,712 A | 12/1999 | Moiin et al. | 395/200.5 |
| 6,038,651 A | 3/2000 | Van Huben et al. | 712/21 |
| 6,167,437 A | 12/2000 | Stevens et al. | 709/214 |
| 6,205,528 B1 | 3/2001 | Kingsbury et al. | 711/170 |
| 6,289,424 B1 | 9/2001 | Stevens | 711/170 |
| 6,336,177 B1 | 1/2002 | Stevens | 711/170 |

(Continued)

OTHER PUBLICATIONS

Culler et al. "Parallel Computer Architecture", 1999, Morgan Kaufmann, p. 553-560.*

(Continued)

*Primary Examiner*—Mano Padmanabhan
*Assistant Examiner*—Paul Baker
(74) *Attorney, Agent, or Firm*—Lynn Augspurger; Cantor Colburn LLP

(57) ABSTRACT

A modular multiprocessor computer system having a plurality of nodes each being in communication with each other via communication links. The plurality of nodes each have local memory and local cache accessible by the other nodes. The plurality of nodes each also having a cache directory, one or more processing units, and a memory coherent directory to keep track of the scope of ownership of data within the modular multiprocessing computer system. The local memory and the local cache contain configurable regions of storage, wherein memory coherency traffic on the communication links between the nodes is controlled through the use of the memory coherent directory during a data request.

22 Claims, 3 Drawing Sheets

U.S. PATENT DOCUMENTS

| | | |
|---|---|---|
| 6,505,286 B1 | 1/2003 | Kingsbury et al. .......... 711/170 |
| 6,874,053 B1 * | 3/2005 | Yasuda et al. .............. 710/305 |
| 6,901,485 B1 * | 5/2005 | Arimilli et al. ............. 711/135 |
| 2002/0083149 A1 | 6/2002 | Van Huben et al. ........ 709/215 |
| 2002/0083243 A1 | 6/2002 | Van Huben et al. ........ 710/107 |
| 2002/0083299 A1 | 6/2002 | Van Huben et al. .......... 712/29 |
| 2003/0009634 A1 | 1/2003 | Arimilli et al. ............. 711/141 |
| 2003/0009639 A1 | 1/2003 | Arimilli et al. ............. 711/146 |
| 2003/0009640 A1 | 1/2003 | Arimilli et al. ............. 711/147 |
| 2003/0009641 A1 | 1/2003 | Arimilli et al. ............. 711/147 |

OTHER PUBLICATIONS

US 6,021,479, 02/2000, Stevens (withdrawn)

* cited by examiner

MEMORY MANAGEMENT FOR A SYMMETRIC MULTIPROCESSOR COMPUTER SYSTEM

TECHNICAL FIELD

This disclosure relates to large shared-memory multiprocessing computer systems built from multiple building blocks each of which contains memory and one or more processors. More particularly, an exemplary embodiment is directed to an apparatus and method for keeping track of the scope of ownership of the shared memory of a multiprocessing system.

TRADEMARKS

IBM® is a registered trademark of International Business Machines Corporation, Armonk, N.Y., U.S.A. Other names may be registered trademarks or product names of International Business Machines Corporation or other companies.

BACKGROUND

Recent trends have been for large computer systems to be built not as a single large processor, but from smaller, often modular building blocks, hereafter referred to as nodes, each containing their own processors and memory and for these nodes to be loosely or tightly coupled to form a large multiprocessor system image. These system structures reduce the total number of independent systems that must be maintained, and allow the flexibility of running a small number of large workloads or a large number of small workloads.

However, in the case of a tightly coupled system (e.g., shared memory systems with a smaller package or available real estate for the nodes) this configuration may compromise the system performance for smaller applications. In a tightly coupled system there is a shared memory model wherein programs or applications can be run on any processor or node in the system. Thus, as the programs move between the nodes related data is in the shared memory of the nodes of the system. Thus, as the program moves snoops may have to be made across the system to determine the location of the most recent copy of the data. As these snoops are made they are broadcast to all of the nodes since the system does not know where the most recent copy of the requested data is. Such broadcasting increases the coherency traffic between the nodes and may limit the system performance due to queueing of the requests in the communication links connecting the nodes.

This is because coherency checking across memories and caches of larger system structures in order to find the most recent copy of the requested data increases the sensitivity to misses in the local cache by driving additional coherency checking traffic across the connections between the nodes.

As the system grows in size, the related increase in coherency checking extracts an increasing performance penalty from an interconnect structure that necessarily has limited capacity and response time due to package restrictions.

This increasing performance penalty, which is related to coherency checking on the interconnects, causes problems with scaling to larger structures and limits the effectiveness of such larger structures.

Prior to the methods and apparatus of the present application large modular systems had two choices: 1) they could either be run as a large single image with potentially multiple logical partitions running operating system images that potentially span multiple nodes requiring storage coherency checking across the entire system complex which introduced a performance penalty for the checking of all memory accesses across the entire system, or 2) they could be physically or firmly partitioned into inflexible separate operating zones that avoided this storage coherency checking on the system fabric, but as a result had no access to the memory of any other zone.

Accordingly, there was no in-between option that allowed the flexibility of applications in some zones having access to memory across the complex while others enjoyed the efficiency and speed of local memory access without involving coherency checking across the system fabric, and there was no mechanism for transitioning from one mode to the other in a dynamic, streamlined fashion.

Therefore, it is desirable to provide an apparatus and method for keeping track of where data has been cached and minimizing the amount of broadcasts related to coherency checking across the system.

SUMMARY

In accordance with an exemplary embodiment, a modular multiprocessor computer system is provided. The modular multiprocessor system has a plurality of nodes each being in communication with each other via communication links. The plurality of nodes each have local memory and local cache accessible by the other nodes. The plurality of nodes each also have a cache directory, one or more processing units, and a memory coherent directory to keep track of the scope of ownership of data within the modular multiprocessing computer system. The local memory and the local cache contain configurable regions of storage, wherein memory coherency traffic on the communication links between the nodes is controlled through the use of the memory coherent directory during a data request.

In another exemplary embodiment a method of limiting or controlling memory coherency traffic on the communication links between a plurality of nodes is provided. The method, comprising the steps of: managing the ownership of configurable regions of shared memory of the plurality of nodes; limiting the requests for the most recent version of configurable regions of the shared memory of the plurality of nodes across the communication links by determining if the most recent storage of a requested piece of data has been cached on a requesting node, if so no request for the most recent version of the requested piece of data is made across the communication links.

In another exemplary embodiment a system for controlling memory coherency traffic in a multiprocessing system is provided. The system having a plurality of nodes each having local memory accessible by the plurality of nodes; local cache accessible by the plurality of nodes, the local memory and the local cache contain configurable regions of storage. The plurality of nodes each also having one or more processing units; a cache directory; a memory configuration table identifying the location of the local memory of each of the plurality of nodes; a memory coherent directory; a central processing pipeline through which all remote requests for access of data in the local memory or said local cache must pass, the central processing pipeline being in communication with the cache directory, the memory configuration table and the memory coherent directory, wherein each of the plurality of nodes is in communication with each other via communication links; and application software located on the multiprocessing system implements the method comprising: controlling the coherency traffic on the communication links between the plurality of nodes through the use of the memory coherent directory to keep track of the scope of ownership of data within the plurality of nodes during data requests.

Figure 1:
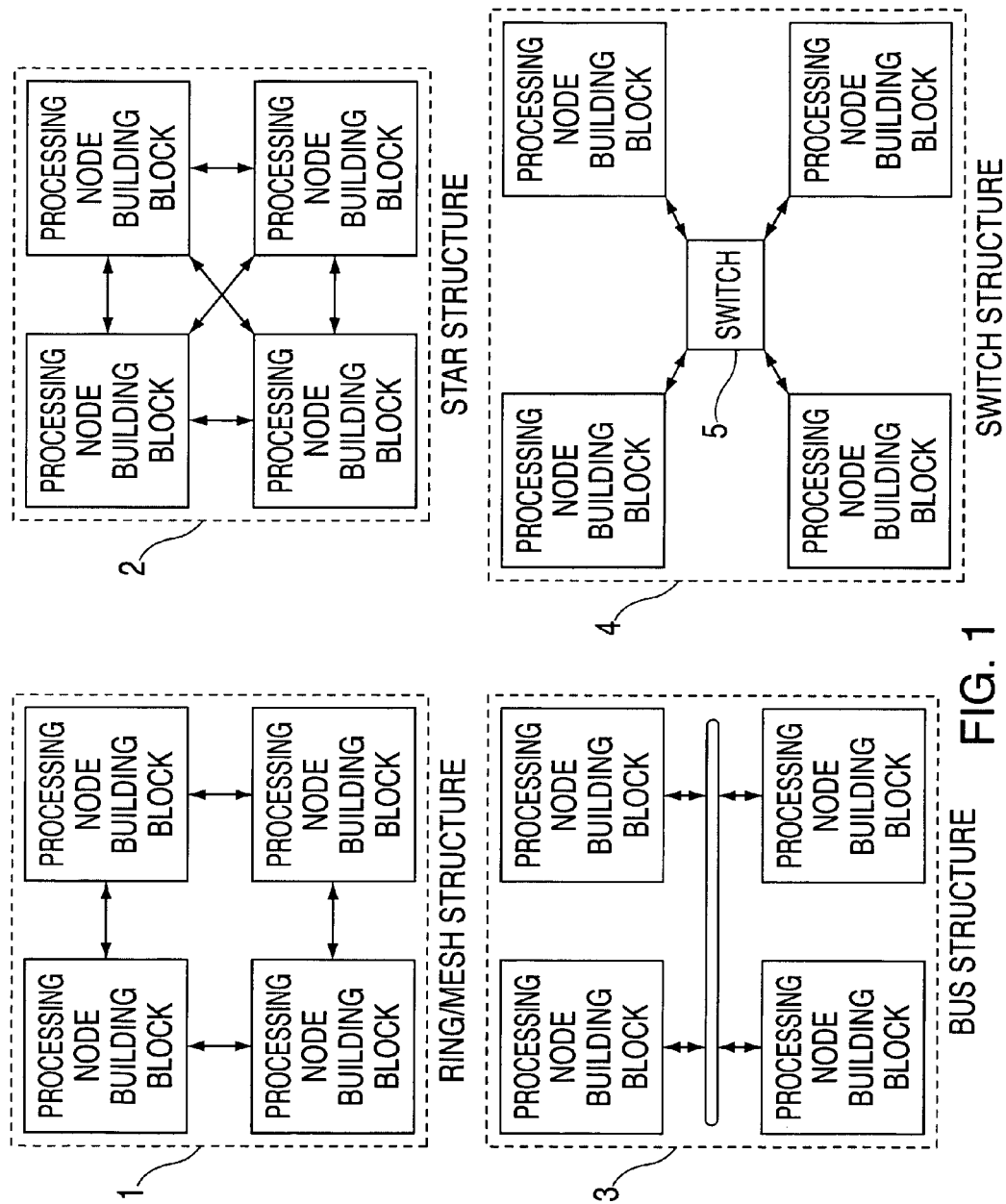
FIG. 1 illustrates several possible configurations of symmetric multiprocessing computer systems with different interconnect structures.

Our detailed description explains the preferred embodiments of exemplary embodiments, together with advantages and features, by way of example with reference to the drawings.

DETAILED DESCRIPTION OF THE DISCLOSURE

An exemplary embodiment is disclosed wherein a low cost hardware solution is provided to provide the flexibility of running a large modular system as a tightly coupled system with full storage coherency maintained across the entire system fabric for some applications, or as a logically partitioned system with storage coherency maintained within either individual nodes for some applications that are contained within one node, or across nodes for other applications that span node boundaries, and of providing each of these capabilities simultaneously and managing these capabilities automatically through features in the hardware dedicated specifically to this purpose.

Disclosed is an apparatus and method for minimizing memory coherency traffic in a system where a tightly coupled shared memory multiprocessing computer system built from modular building blocks (nodes) each containing processing elements, memory and cache may share portions of memory among multiple nodes, effecting a large shared memory single system image, while simultaneously supporting other workloads contained within a single node using regions of memory that are not shared between nodes and hence require no coherency checking between nodes, and for dynamically adjusting to accommodate either memory mode for various regions of storage. This is accomplished by implementing a small memory coherent directory that detects and records which regions of memory are used by multiple nodes, and adjusts coherency handling accordingly. This provides a low cost solution for improving performance by reducing memory coherency requests on the interconnecting fabric when the workload is partitioned into multiple smaller workloads some of which can be contained within one of the building blocks of the system.

In the present example, system memory and processor resources are partitioned by software, with some regions of storage serving applications that run across multiple nodes and require full system-wide coherency management, while other regions of memory will be dedicated to applications running within a single node not requiring coherency management between nodes. The disclosed scheme uses a small memory coherent directory containing remote access tag bits each representing a large configurable area of storage. These bits are set by hardware logic by detecting data taken from one node for use on another node, and control the scope of future coherency checking for the corresponding area of storage. The array purposely only tracks usage of large blocks of memory as a whole, not individual addresses. This allows a small storage array to be utilized for these bits, and by not perfectly tracking the state of every address (by allowing some addresses to be indicated as having been used outside the owning node when in fact they have not, when in reality only other addresses within the region of storage covered by the same tag bit have been used outside the owning node, or when in reality data that has been used outside the node is no longer held outside the node), minimizes the traffic between nodes needed for maintaining the state of the bits. When coupled with an operating system that assigns regions of storage to processors within the same node where possible, it is expected this will produce an efficiency similar to that obtained with a larger more accurate array, with much less traffic for maintaining the state of the array.

In addition, the disclosed scheme uses remote lock registers to permit data owned by one node to be "borrowed" by another node for temporary use, for example to be updated by I/O ports located on another node, and for immediate return without setting the corresponding remote access tag bit.

A symmetric multiprocessor computer system (SMP) may be constructed of multiple similar building blocks. There are a number of possible system configurations, some of which are illustrated in FIG. 1. Examples of such configurations are discussed below with reference to FIG. 1. The configurations provided in FIG. 1 are intended to be provided as examples and the application is not intended to be limited by the same.

A ring, or mesh, structure 1 is illustrated in FIG. 1 wherein each processor node or building block is adapted to communicate only with its nearest neighbors, and communication with more distant nodes must pass through intermediate nodes. Such a structure may be either a flat structure, or a multilevel hierarchical structure where clusters of nodes connect with other clusters of nodes.

A star structure 2 is also illustrated in FIG. 1 wherein each node is adapted to be connected and communicate directly with every other node.

A bus structure 3 is also illustrated in FIG. 1 where all communications of the processing node building blocks flow over a common bus. The bus typically allows communication from any point to any other point, but limits such communication to one point-to-point connection at a time.

A switched structure 4 is also illustrated in FIG. 1 where communication between the processing node building blocks is facilitated through a centralized switch 5. In this case, the switch may permit simultaneous communications with multiple nodes at the same time. In a more complex hierarchical structure, multiple switches may also communicate with each other, forming clusters of nodes around each switch.

In accordance with an exemplary embodiment, the invention is understood to apply to any one of the above structures or any other configuration of a shared memory system wherein the memory on any one node is addressable from any node.

In accordance with an exemplary embodiment, the invention seeks to limit memory coherency traffic on the communication links between or within the nodes shown in any of the system structures shown in FIG. 1, as well as any other structures including hierarchical structures, and the invention disclosed herein shall be construed to apply to any and all such structures with any number of nodes.

By making unnecessary a portion of memory coherency traffic in the shared memory system, congestion on the node interconnects is reduced and system performance is improved.

Figure 2:
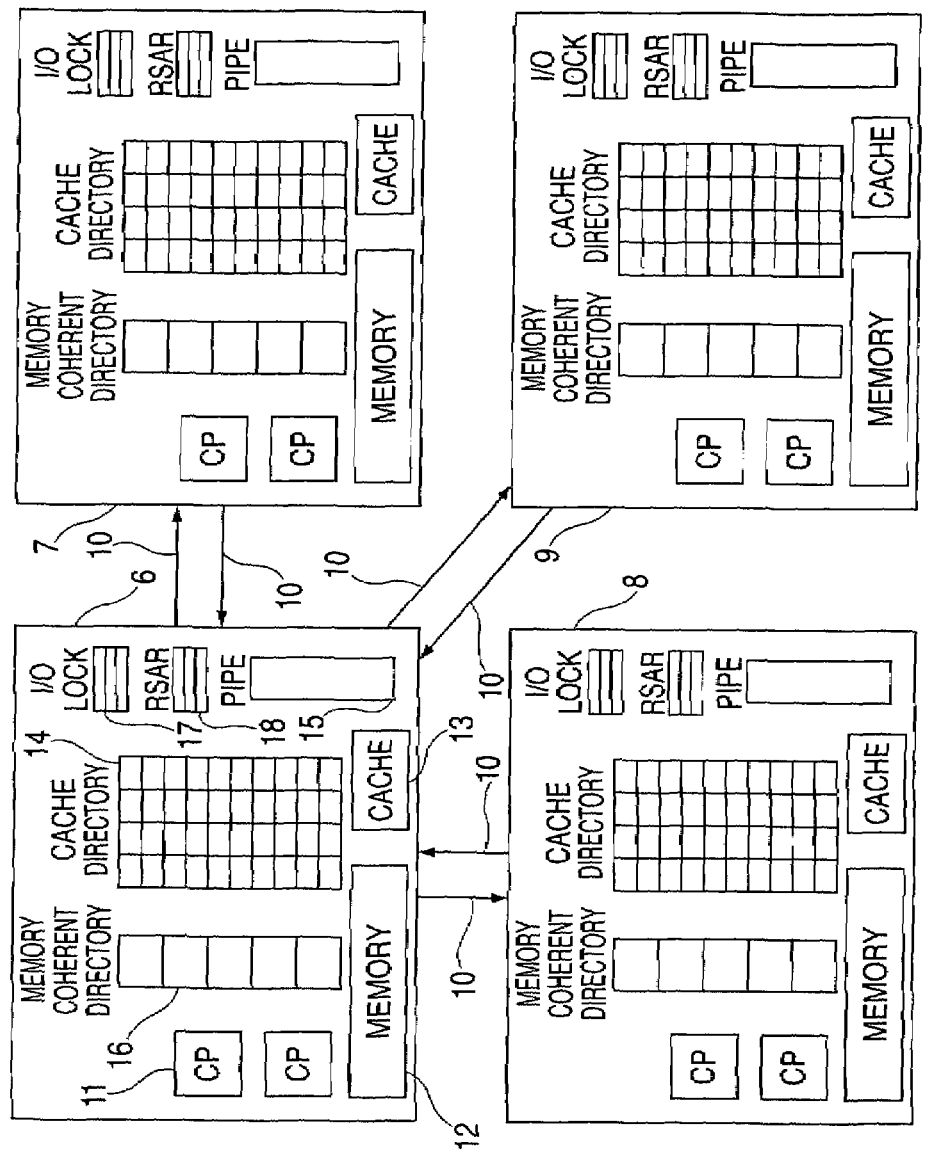
FIG. 2 illustrates a multi-node system with each node constituting a complete viable computer system containing processors, memory, and a processing pipeline.

FIG. 2 illustrates an SMP system configuration that is comprised of four nodes 6, 7, 8, and 9. Each node shall have some number of communications links 10 adapted to facilitate communication with other nodes as for example, any one of the system structures shown in FIG. 1.

Each node shall have a number of elements to form an autonomous computing unit, including typically one or more processors 11, a local memory 12 (accessible by all nodes), a local cache 13 (also accessible by all nodes), and a cache directory 14. In an exemplary embodiment there is also a processing pipeline 15, through which all requests for storage access must pass.

The nodes of an exemplary embodiment add a memory coherent directory 16 to manage memory coherency traffic between the nodes (e.g., accessing of the local cache and local memory of the nodes). This memory coherent directory 16 is implemented independently of the cache directory 14, with different granularity (with granularity being defined as the amount of storage represented by one directory entry) and possibly also different access timing.

Figure 3:
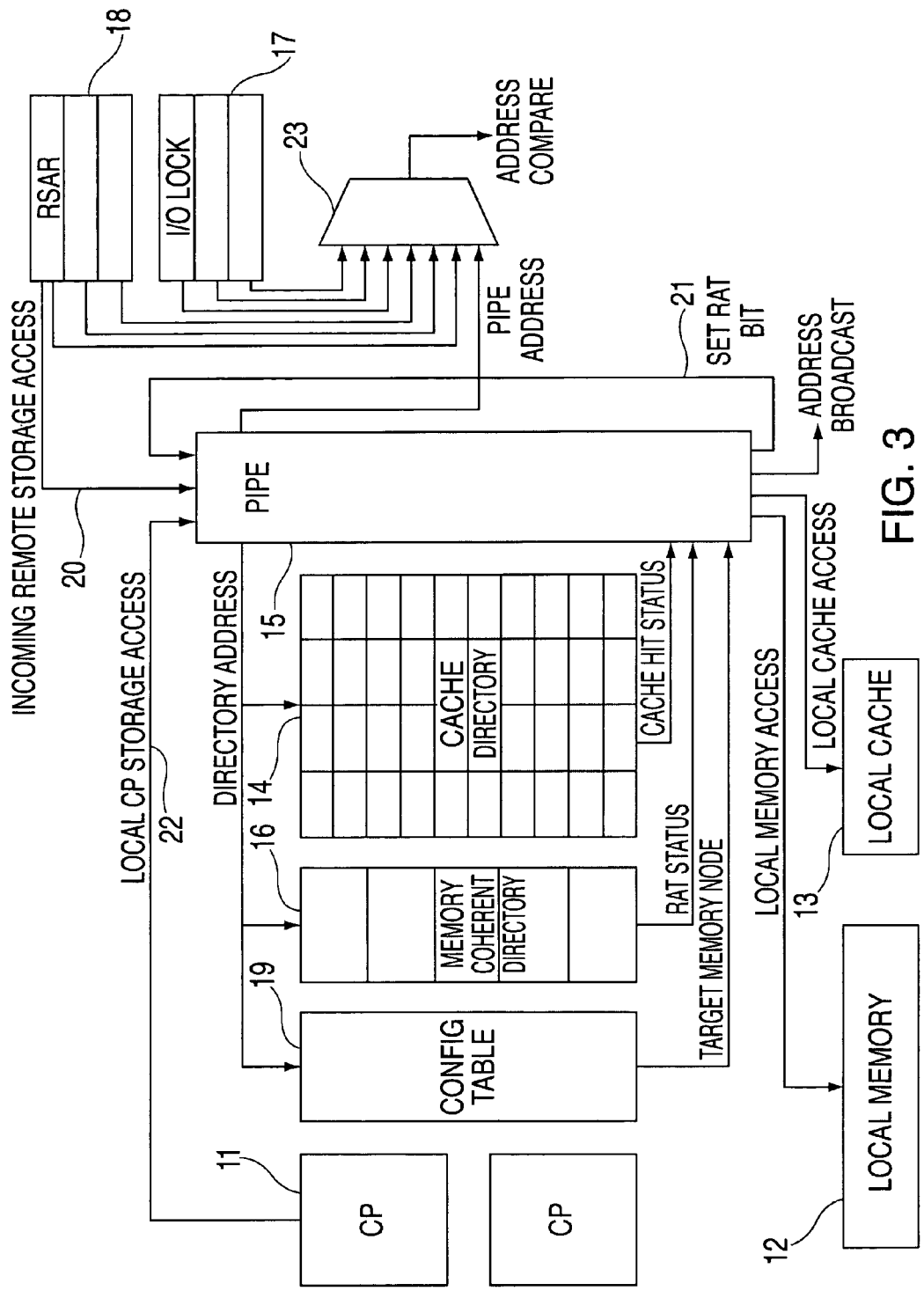
FIG. 3 illustrates in greater detail the components contained within one of the nodes of FIG. 2.

These components are illustrated again in FIG. 3, which illustrates in greater detail some of the components contained within one node. In addition to local memory 12, local cache 13, cache directory 14, pipeline 15, and memory coherent directory 16, this figure also illustrates an optional memory configuration table 19, and interconnections between these elements. The memory configuration table 19 provides information to identify the location of the memory element and particular node of any addressable storage unit. Moreover, and in some implementations the memory configuration table 19 may provide information about the physical location within the memory element, of any addressable storage unit.

In an exemplary embodiment the cache may be a "store-in" cache that may hold changed data within the cache of any node, and this node may not store the changes back to memory until the data is required at another node or the cache location must be vacated for other use. In order to maintain storage coherency it is therefore necessary when accessing any storage location (local memory or local cache) to locate and use this most recently changed copy of the data, wherever it may reside, which may be in the cache of any node or in memory.

It must also be recognized that while changed data is held in cache, the corresponding location in memory may contain an older copy of the data that does not reflect recent updates. This older copy in memory must not be used when newer data exists within a cache, since this would constitute a storage coherency violation. In an exemplary embodiment, all processors must always see the most recent copy of the data. As will be discussed below the in accordance with an exemplary embodiment a method and apparatus is provided for ensuring that all processors always see the most recent copy of the data.

In the exemplary embodiment, a unit of addressable storage may be assigned to a memory element 12 on any of the nodes in the system. This data may be accessed, used, and cached on the same node or on any other node. In order to locate data that is not already cached locally, memory configuration table 19 identifies the node 6, 7, 8, or 9, and thereby the memory element 12, and in some implementations the physical location within said memory element, for any addressable storage unit.

Memory configuration table 19 may be simply a fixed decode of a portion of the memory address identifying only the target node, or it may be a more elaborate table that may be programmed or even dynamically reprogrammed to effect dynamic storage relocation. This table will typically have a much coarser granularity than the smallest addressable storage unit or the cache line size (which corresponds to the cache directory granularity). The memory configuration table 19 need only have enough granularity to support block sizes or storage regions such as may be assigned to particular applications or even operating systems or partitions operating within the SMP structure, and in some system structures, may only have granularity corresponding to the entire memory element 12 within one node.

In accordance with an exemplary embodiment the method and apparatus for limiting or controlling memory coherency traffic is most effective in a system where systems management software maintains affinity between processing units 11, and memory elements 12, such that wherever feasible, processors are assigned to work with memory on their same node. (Although enabling software is not required to implement an exemplary embodiment, it is understood by one skilled in the art as with many other aspects of computing systems, software can optimize performance by being aware of the system structure and adapting to utilize available features most effectively).

It is also understood that the processors of each node are not required to work with the memory on their same node and that software is not required to maintain this affinity, wherein it is also desirable to at the same time support some configurations where a group of processors on one or multiple nodes share a region of memory that may span memory elements on multiple nodes or may be allocated entirely on other nodes.

It is also noted that at the same time some workloads or operating partitions span multiple nodes, other workloads or operating partitions may be confined within one node.

Thus, a means is provided whereby both types of workloads or operating partitions may be supported simultaneously and automatically, with each maintaining and checking storage coherency within the scope of one node or all nodes, as appropriate.

In one embodiment memory coherent directory 16 may be constructed as part of memory configuration table 19, having the same granularity as the memory configuration units, or alternatively may be implemented independently with the same or different granularity. Memory coherent directory 16 must have a sufficient capacity to represent all memory addresses on the local (same) node.

Memory coherent directory 16 contains "Remote Access Tag" (RAT) bits associated with each storage increment, one bit per configurable block size or storage region, that record whether data anywhere within the local memory storage region has been accessed and cached by any other node. These bits are then referenced to determine whether remote nodes need to be searched when accessing data that falls anywhere within the local memory storage region.

In accordance with an exemplary embodiment, the "Remote Access Tag" (RAT) bits are set and accessed are as follows.

When the system is initialized, all RAT bits are cleared to zero. This indicates that no storage has been remotely referenced and cached.

Selected RAT bits may subsequently be reset when the corresponding storage is flushed during a subsequent storage reallocation. This resetting is accomplished by sending a command from a local CP 11 through pipeline 15 to flush address from a selected storage region or the entire cache. This command also writes a zero to the selected RAT bit or the entire Memory Coherent Table 16.

In accordance with an exemplary embodiment, the RAT bits are reset under hardware control when systems management software reallocates storage from one partition or purpose to another. Typically caches are flushed during storage reallocation thereby ensuring the safe resetting of the RAT bits. Such software may be a hypervisor or in some cases an operating system or may even be software running on a service processor under the control of a system operator. This software can be a combination of code on a service processor and of millicode or microcode, a lower-level code that runs beneath the hypervisor or operating system and may be called as a service by said hypervisor or operating system. Accordingly, once a storage region is used by one partition and is moved to another partition the corresponding RAT bits will be reset.

RAT bits are set only when a remote storage access comes in to the storage region owning node from another node, and obtains data that will be cached in another node. For example, and referring now to FIG. 3, an incoming remote storage access 20 arrives from another node (if FIG. 3 illustrates the node labeled 6 in FIG. 2, then the incoming remote storage access would be one that originated in a node labeled 7, 8, or 9).

Once the incoming remote storage access arrives, it is processed by being sent through the processing pipeline 15. As part of this processing step, portions of the address are applied to the cache directory 14 to determine whether the requested data exists in the cache, and may be applied to memory configuration table 19 to determine whether the local memory 12 on this node must be accessed if the requested data is not found in any cache (as an alternative the node containing the target memory might already be identified in the request received from the requesting node).

The output of memory coherent directory 16 is not used during this processing step (e.g., remote storage access from one node to another), but if it is already known during this processing step that the memory is assigned to the local memory 12 on this node then the RAT bit in memory coherent directory 16 can be set by writing the appropriate RAT bit in the memory coherent directory during this processing step. If this processing step finds that the data is resident on this node and is assigned to the local memory 12 on this node and that the data will be returned to and cached in another node, then if the RAT bit in the memory coherent directory 16 was not set during the described processing step, an additional request 21 is routed through the processing pipeline 15 to set the RAT bit in the memory coherent directory 16 corresponding to the referenced region of storage.

The RAT bit update is accomplished by applying a portion of the address from the processing pipeline to the memory coherent directory, with a logic one at the data input, and enabling the array to be written. Thus, future requests for this piece of data will be directed to the node which has the most recent copy of the requested data as will be discussed with reference to the table below.

RAT bits are referenced whenever a request originating on the local node, for example processor 11, accesses storage. A storage access request 22 by processor 11 is also processed through pipeline 15. During this processing step, a portion of the address is applied to cache directory 14 to determine if the data is resident in the local cache 13 and a portion of the address is applied to memory configuration table 19 to determine the location of the physical storage for this address, including in part or in whole the node containing the data. Also, a portion of the address is applied to memory coherent directory 16.

If the cache directory and memory configuration table determine that the data is resident in the local memory 12 (via a memory configuration table 19) but not in the local cache 13 (via cache directory 14), then the RAT bit from memory coherent directory 16 is used to determine whether the address must be broadcast to the other nodes in the SMP complex. If the RAT bit is off, this indicates that no part of this region of memory has ever been cached by any other node, this allows the data to be obtained immediately from the local memory 12 with no search of any other node. Thus, no coherency checking traffic is required or generated for this request. Therefore, the traffic on the interconnects is reduced accordingly.

If the RAT bit is on, then the address must be broadcast to the other nodes to search the caches on the other nodes for the latest version of data (which in the exemplary embodiment may exist in a changed state on these other nodes) before accessing the local memory. The result of this search may be that the data is returned from cache on a remote node, or that the data is ultimately obtained from local memory 12 if it is not returned from any remote node.

Memory coherent directory 16 is only consulted for coherency traffic filtering on the originating node (local to the requesting processor), it is not consulted again for the same purpose on remote nodes after the originating node has launched a search to said remote nodes.

TABLE 1 summarizes the actions on the originating node for various cases when a processor or I/O or other function launches a storage access.

TABLE 1

Originating Node Actions

| | Cache Directory | Remote Access Tag | Memory Home Node | Address Broadcast |
|---|---|---|---|---|
| 1 | Hit | Don't Care | Don't Care | No |
| 2 | Miss | Off | Local | No |
| 3 | Miss | On | Local | Yes |
| 4 | Miss | Don't Care | Remote | Yes |

The first line of TABLE 1 indicates that if the requested data is found in cache on the node local to the request, that the Memory Coherent directory and Memory Configuration Table results are unimportant, and that the data is obtained from said local cache, and no request is broadcast to any other node.

The second line of TABLE 1 indicates that if the requested data is not found in the local cache, and if the Memory Configuration Table indicates that the target address is assigned to memory on the local node, and if the RAT bit indicates that the region of storage containing this data has never been accessed and cached by a remote node, that the address is not broadcast to remote nodes, and that data is obtained from local memory without searching any remote node. Thus, no coherency checking traffic is caused by this request. Therefore, the traffic on the interconnects is reduced accordingly.

The third line of TABLE 1 indicates that if the requested data is not found in the local cache, and if the Memory Configuration Table indicates that the target address is assigned to memory on the local node, and if the RAT bit indicates that the region of storage containing this data has been accessed by a remote node that may have cached the data, that the address must be broadcast to remote nodes to search for the most recent copy of data. The data will be returned from wherever the most recent copy is found, which could be a remote cache, or the local memory of this node.

The fourth line of TABLE 1 indicates that if the requested data is not found in the local cache, and if the Memory Configuration Table indicates that the target address is assigned to memory on another node, that the address must be broadcast to remote nodes regardless of the setting of the RAT bit (in some applications, the Memory Coherent Directory may not even have an entry for addresses that are assigned to memory on remote nodes, so a RAT bit may not even be available). In this case, data will be returned from a remote cache or from remote memory.

Once set, the RAT bit for a region of storage remains set for the duration that the storage region remains in use by the operating partition. The only time the RAT bit is reset is when the system is reset, or when storage is reallocated via a dynamic memory reconfiguration function for use by a new application or operating partition.

No attempt is made to reset the bit if data taken from the owning node and cached on another node is then subsequently removed from the remote node to yet another node or removed entirely. This is because one RAT bit corresponds to many cached lines, and detecting when none of them is cached remotely would introduce additional traffic on the node interconnections, traffic that the apparatus and method of embodiments disclosed herein intends to control, limit or minimize. Instead, it is assumed that if remote caching of data is detected that the data is part of a region of storage that is shared by multiple nodes, and that trying to track which individual cached lines within this shared region is remotely cached would not produce significantly better results than tracking the entire region of storage as a whole.

In accordance with an exemplary embodiment, the RAT bits must be set whenever storage is removed from the owning node and cached in another node. Additional hardware functions are defined to minimize, reduce, limit or control the number cases where the RAT bit must be set. These functions will now be explained.

In addition, to the above methods and means for limiting or controlling memory coherency traffic on the communication links between or within the nodes, hardware facilities are provided on the node that owns the data to allow it to be updated from another node without the RAT bit being set, which will also limit the memory coherency traffic.

I/O Lock Registers 17 and Remote Storage Controller (RSAR) Controllers 18 in FIG. 2 together form a system for allowing updates to storage on the node by a controller on another node without caching the data on the updating node and without setting the RAT bit. An example of RSAR Controllers 18 is found in U.S. patent application Ser. No. 09/745,593, filed Dec. 22, 2000, the contents of which are incorporated herein by reference thereto. This capability is provided for I/O controllers in the exemplary embodiment, since these may update data without caching it (reading data for a one time usage without modifying or caching it requires no special controls, the data is simply taken without setting the RAT bit or I/O Lock Register).

RSAR Controller 18 is utilized when a full line of data is to be updated. The I/O controller on the originating node, 7 in this example, following TABLE 1 line 4, broadcasts the request to the other nodes. When the update request arrives at the node where the store will take place and locates the data to be updated, 6 in this example, the RSAR controller 18 locks the line and prevents any usage of the data by any other process before the update is completed. RSAR controller 18 accomplishes this by providing the locked address to address comparator 23. When the lock is active, comparator 23 will report a compare to any request with a matching address passing through pipeline 15 and this compare report will cause the comparing request in the pipeline to stop processing until the lock is released. Once the remaining nodes have been searched and the update is ready to proceed, the RSAR controller updates the data and unlocks the line.

I/O Lock Register 17 is provided to allow data to be removed from the owning node to another node for update, then to be returned to the owning node at the conclusion of the update wherein the updated data is returned to either the local cache or the local memory of the owning node, without caching on the updating node and without setting the RAT bit. This capability is used in the exemplary embodiment to allow I/O controllers to perform partial updates or other complex modifications of addressable units of data even if said controllers are not on the node where the data resides. To accomplish this, an I/O controller in an originating node, 7 in this example, requests temporary ownership of data from the node that owns the data and maintains it in its local memory 12, node 6 in this example. When the owning node 6 transfers the data to updating node 7, it does not set the RAT bit, but instead locks the specific address in an I/O lock register 17. I/O Lock Register 17 accomplishes this by providing the locked address to address comparator 23. When the lock is active, comparator 23 will report a compare to any request with a matching address passing through pipeline 15 on the owning node and this compare report will cause the comparing request in the pipeline to stop processing until the lock is released.

The updating node then receives and updates the data, and is then required to send it back to the owning node 6 via a Store Putaway command. Once the update is stored back in the owning node 6, the lock in I/O lock register 17 is released. During the time the data is locked by I/O lock register 17, the owning node 6 will prevent any other usage of the data.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A modular multiprocessor computer system, comprising:
   a plurality of nodes each being in communication with each other via communication links, each of said plurality of nodes comprising:
      local memory accessible by said plurality of nodes;
      local cache accessible by said plurality of nodes, said local memory and said local cache include configurable regions of storage;
      local cache directory;
      one or more processing units; and
      a memory coherent directory for keeping track of whether any portion of said configurable regions of storage has been cached on one of said plurality of nodes;
   wherein said memory coherent directory has a plurality of Remote Access Tag (RAT) bits that represent said configurable regions of storage, said plurality of Remote Access Tag bits indicate whether any portion of said configurable regions of storage has been cached on any of said plurality of nodes.

2. The modular multiprocessor as in claim 1, wherein each of said plurality of nodes further comprises:
   a central processing pipeline wherein all remote requests for access of data in said local memory or said local cache of said plurality of nodes must pass, said central processing pipeline being in communication with said local cache directory; and
   a memory configuration table identifying the location of said local memory of each of said plurality of nodes, said memory configuration table being in communication with said central processing pipeline;
   wherein said memory coherent directory is in communication with said central processing pipeline.

3. The modular multiprocessor as in claim 1, wherein said plurality of Remote Access Tag bits are located within said memory coherent directory, said memory coherent directory being an array comprised of individually addressable bits.

4. The modular multiprocessor as in claim 3, wherein one of said plurality of Remote Access Tag bits is set to provide a detectable indication when data belonging to said configurable region of storage corresponding to said one of said plurality of Remote Access Tag bits is removed from one of said plurality of nodes to be cached on another one of said plurality of nodes.

5. The modular multiprocessor as in claim 4, wherein said Remote Access Tag bit corresponding to a configurable region of storage is set automatically when data is removed from said region of storage in one of said plurality of nodes to be cached on another one of said plurality of nodes.

6. The modular multiprocessor as in claim 1, wherein data of said local memory or said local cache of one of said plurality of nodes is obtained from said one of said plurality of nodes if said data is found in said local cache of said one of said plurality of nodes, said data being obtained regardless of the indication of said plurality of Remote Access Tag bits.

7. The modular multiprocessor as in claim 1, wherein one of said plurality of nodes is a requesting node and requests for said configurable regions of storage may be obtained from said requesting node without searching said plurality of nodes not comprising said requesting node if said requested configurable regions of storage is assigned to said local memory of said requesting node and said requested configurable regions of storage is not found in said local cache of said requesting node and a Remote Access tag bit corresponding to said requested configurable regions of storage indicates that said requested configurable regions of storage has not been cached on said plurality of nodes not comprising said requesting node.

8. The modular multiprocessor as in claim 1, wherein one of said plurality of nodes is a requesting node and said requesting node must search all of said plurality of nodes not comprising said requesting node for the most recent copy of a requested piece of data in said configurable regions of storage if said requested piece of data is assigned to said local memory of said requesting node and said requested piece of data is not found in said local cache of said requesting node and a Remote Access Tag bit corresponding to said requested piece of data indicates that said requested piece of data has been cached on one of said plurality of nodes not comprising said requesting node.

9. The modular multiprocessor as in claim 1, wherein one of said plurality of nodes is a requesting node and said requesting node must search all of said plurality of nodes not comprising said requesting node for the most recent copy of a requested piece of data in said configurable regions of storage if said requested piece of data is not assigned to said local memory of said requesting node and said requested piece of data is not found in said local cache of said requesting node, said data being obtained regardless of the indication of said plurality of Remote Access Tag bits.

10. The modular multiprocessor as in claim 1, wherein said plurality of Remote Access Tag bits are reset to indicate that said configurable regions of storage are not cached on any of said plurality of nodes when said configurable regions of storage corresponding to said plurality of Remote Access Tag bits are reallocated to a new partition or purpose within the modular multiprocessor.

11. The modular multiprocessor as in claim 10, wherein said multiprocessor resets Remote Access Tag bits when it receives a command to flush cache and reconfigure said configurable region of storage corresponding to said reset Remote Access Tag bit to a new partition or purpose.

12. The modular multiprocessor as in claim 1, wherein each of said plurality of nodes further comprises:
   a hardware address lock register, said hardware address lock register temporarily locks a line of data of one of said plurality of nodes against use including updates by all of said plurality of nodes while said line of data is temporarily moved to a requesting node of said plurality of nodes for updating but not caching within said requesting node.

13. The modular multiprocessor as in claim 12, wherein said hardware address lock register is provided with an address corresponding to said line of data and said hardware address lock register is activated to lock said address when said line of data stored at said address is sent from one of said plurality of nodes to another one of said plurality of nodes for update.

14. The modular multiprocessor as in claim 12, wherein said hardware address lock register is deactivated when said line of data locked by said hardware address lock register is returned to and stored in said one of said plurality of nodes.

15. The modular multiprocessor as in claim 12, wherein each of said plurality of nodes further comprises:
   an address compare mechanism, said address compare mechanism compares all relevant addresses processed on said one of said plurality of nodes having said line of data locked by said hardware address lock register, wherein said address compare mechanismn causes any request of an address matching that of said line of data locked by said hardware address lock register, to stop and wait for said line of data locked by said hardware lock address register to be released.

16. A method of limiting or controlling memory coherency traffic on communication links between a plurality of nodes of a multiprocessor system, comprising:
   managing the ownership of configurable regions of shared memory of the plurality of nodes;
   limiting the requests for the most recent version of said configurable regions of said shared memory of the plurality of nodes across the communication links by determining if the most recent storage of a requested piece of data has been cached on a requesting node of one of the plurality of nodes, if so no request for the most recent version of said requested piece of data is made across the communication links;
   wherein the step of determining if the most recent storage of requested piece of data has been cached on said requesting node further comprises, checking an indication address of a memory coherent directory wherein said indication address of said memory coherent directory corresponds to said requested piece of data and will indicate wether said requested piece of data has been accessed and cached by any one of the plurality of nodes not being assigned said requested piece of data.

17. The method as in claim 16, further comprising an apparatus for allowing said requested data to be temporarily moved from one of the plurality of nodes that is an assigned node to mother one of the plurality of nodes without modifying the corresponding indication address of said memory coherent directory.

18. The method as in claim 17, wherein said apparatus for allowing comprises a lock register.

19. The method as in claim 17, wherein said requested data is returned to one of the plurality of nodes that is said assigned node after said requested data is updated on another one of the plurality of nodes that is a requesting node.

20. The method as in claim 16, further comprising a RSAR controller that temporarily locks said requested data on an assigned node and preserves the coherency of said requested data while coherency checking is completed on the plurality of nodes and until said requested data is updated on said assigned node.

21. A system for controlling memory coherency traffic in a multiprocessing system, the system comprising:
a plurality of nodes each comprising:
local memory accessible by said plurality of nodes;
local cache accessible by said plurality of nodes, said local memory and said local cache contain configurable regions of storage;
a cache directory; a memory configuration table identifying the location and ownership of said local memory of each of said plurality of nodes;
a memory coherent directory;
a central processing pipeline through which all remote requests for access of data in said local memory or said local cache must pass, said central processing pipeline being in communication with said cache directory, said memory configuration table and said memory coherent directory; and
one or more processing units;
wherein each of said plurality of nodes are in communication with each other via communication links;
the multiprocessing system implementing the method comprising:
controlling the coherency traffic on said communication links between said plurality of nodes through the use of said memory coherent directory to keep track of the scope of ownership of data within said plurality of nodes during data requests.

22. The system as in claim 21, wherein said memory coherent directory has a plurality of remote access tag bits each representing a block of said local memory or said local cache and one of said plurality of remote access tag bits is configured to provide an indication when any portion of data within said block of said local memory or said local cache corresponding to said remote access tag bit is removed from one of said plurality of nodes to another one of said plurality of nodes.

* * * * *